(12) United States Patent
Aoike et al.

(10) Patent No.: US 9,841,108 B2
(45) Date of Patent: Dec. 12, 2017

(54) MECHANICAL SEAL (75) Inventors: Hiroshi Aoike, Tokyo (JP); Takeshi Ikarashi, Tokyo (JP)

(73) Assignees: EAGLE INDUSTRY CO., LTD. (JP); EAGLEBURGMANN JAPAN CO., LTD. (JP)

( * ) Notice: Subject to any disclaimer, the term of this patent is extended or adjusted under 35 U.S.C. 154(b) by 0 days.

(21) Appl. No.: 14/124,653

(22) PCT Filed: Apr. 27, 2012

(86) PCT No.: PCT/JP2012/061349
§ 371 (c)(1),
(2), (4) Date: Dec. 6, 2013

(87) PCT Pub. No.: WO2012/169297
PCT Pub. Date: Dec. 13, 2012

(65) Prior Publication Data
US 2014/0091530 A1    Apr. 3, 2014

(30) Foreign Application Priority Data

Jun. 10, 2011  (JP) ................................. 2011-129708

(51) Int. Cl.
*F16J 15/34*    (2006.01)
*F16J 15/38*    (2006.01)

(52) U.S. Cl.
CPC ............. *F16J 15/38* (2013.01); *F16J 15/344* (2013.01)

(58) Field of Classification Search
CPC .. F16J 15/3404; F16J 15/3248; F16J 15/3252; F16J 15/3221; F16J 15/38; F16J 15/344
(Continued)

(56) References Cited

U.S. PATENT DOCUMENTS 4,889,349 A * 12/1989 Muller ................. F16J 15/3208
                                                      277/556
8,083,235 B2 * 12/2011 Azibert et al. ................ 277/349
(Continued)

FOREIGN PATENT DOCUMENTS

EP    2172679 A1 *  4/2010  ............... F16J 15/34
JP    S53-026767 U1    3/1978
(Continued)

OTHER PUBLICATIONS

Notification of Transmittal of Translation of the International Preliminary Report on Patentability (PCT/IB/338) dated Dec. 27, 2013, with International Preliminary Report on Patentability (PCT/IB/373) and Written Opinion of the International Searching Authority (PCT/ISA/237), for corresponding international application PCT/JP2012/061349.

(Continued)

*Primary Examiner* — Nathan Cumar
(74) *Attorney, Agent, or Firm* — Hayes Soloway P.C.

(57) ABSTRACT

An inside-type mechanical seal is mounted between a rotating shaft and a housing, and adapted for preventing leakage of a sealed fluid from an outer circumference of a sliding surface in the direction of an inner circumference thereof, wherein provided are a rotary-side sealing ring mounted on a rotating shaft side, a stationary-side sealing ring mounted on a seal case side, an annular packing for pushing the stationary-side sealing ring toward the rotary-side sealing ring, a holding part on the outer circumferential side being fitted in the seal case, and a seal lip part on the inner circumferential side being in close contact with the stationary-side sealing ring, and wherein provided to the seal case is a ring-shaped projection abutting against a back surface of the packing during assembly of the mechanical seal, and (Continued)

adapted for pushing the packing toward the stationary-side sealing ring.

10 Claims, 7 Drawing Sheets

(58) Field of Classification Search
USPC ....... 277/377, 380, 345, 361, 368, 369, 370, 277/371, 408
See application file for complete search history.

(56) References Cited

U.S. PATENT DOCUMENTS

| | | | |
|---|---|---|---|
| 8,720,899 B2* | 5/2014 | Azibert et al. ................ | 277/349 |
| 8,764,018 B2* | 7/2014 | Schwerdtfeger .............. | 277/394 |
| 2003/0042681 A1* | 3/2003 | Takahashi ............ | F16J 15/3404 |
| | | | 277/349 |
| 2003/0102631 A1* | 6/2003 | Takahashi ............ | F16J 15/3464 |
| | | | 277/370 |
| 2007/0267819 A1 | 11/2007 | Azibert et al. | |
| 2009/0096175 A1* | 4/2009 | Schwerdtfeger ....... | F16J 15/002 |
| | | | 277/549 |
| 2010/0117303 A1* | 5/2010 | Takahashi ..................... | 277/352 |

FOREIGN PATENT DOCUMENTS

| | | | |
|---|---|---|---|
| JP | 2 40163 | * | 3/1990 |
| JP | H02-040163 U1 | | 3/1990 |
| JP | 2003-074714 A | | 3/2003 |
| JP | 2005-207520 A | | 8/2005 |
| JP | 2009-537759 A | | 10/2009 |
| JP | 2010-216587 A | | 9/2010 |
| WO | 2009/008289 A1 | | 1/2009 |

OTHER PUBLICATIONS

International Search Report (ISR) dated Aug. 7, 2012, issued for International application No. PCT/JP2012/061349.

* cited by examiner

MECHANICAL SEAL

This application is the U.S. National Phase under 35 U.S.C. §371 of International Application PCT/JP2012/061349, filed Apr. 27, 2012, which claims priority to Japanese Patent Application No. 2011-129708, filed Jun. 10, 2011. The International Application was published under PCT Article 21(2) in a language other than English.

TECHNICAL FIELD

The present invention relates to a mechanical seal which is useful when used in a pump or apparatus for treating slurries or other fluids.

BACKGROUND ART

The mechanical seal described by the present applicant in Domestic Republication of PCT International Application No. 2009-008289 (Patent Document 1) (hereinafter called "the prior art") has been known in the past as a mechanical seal suitable for sealing in slurries or other fluids.

Figure 6:
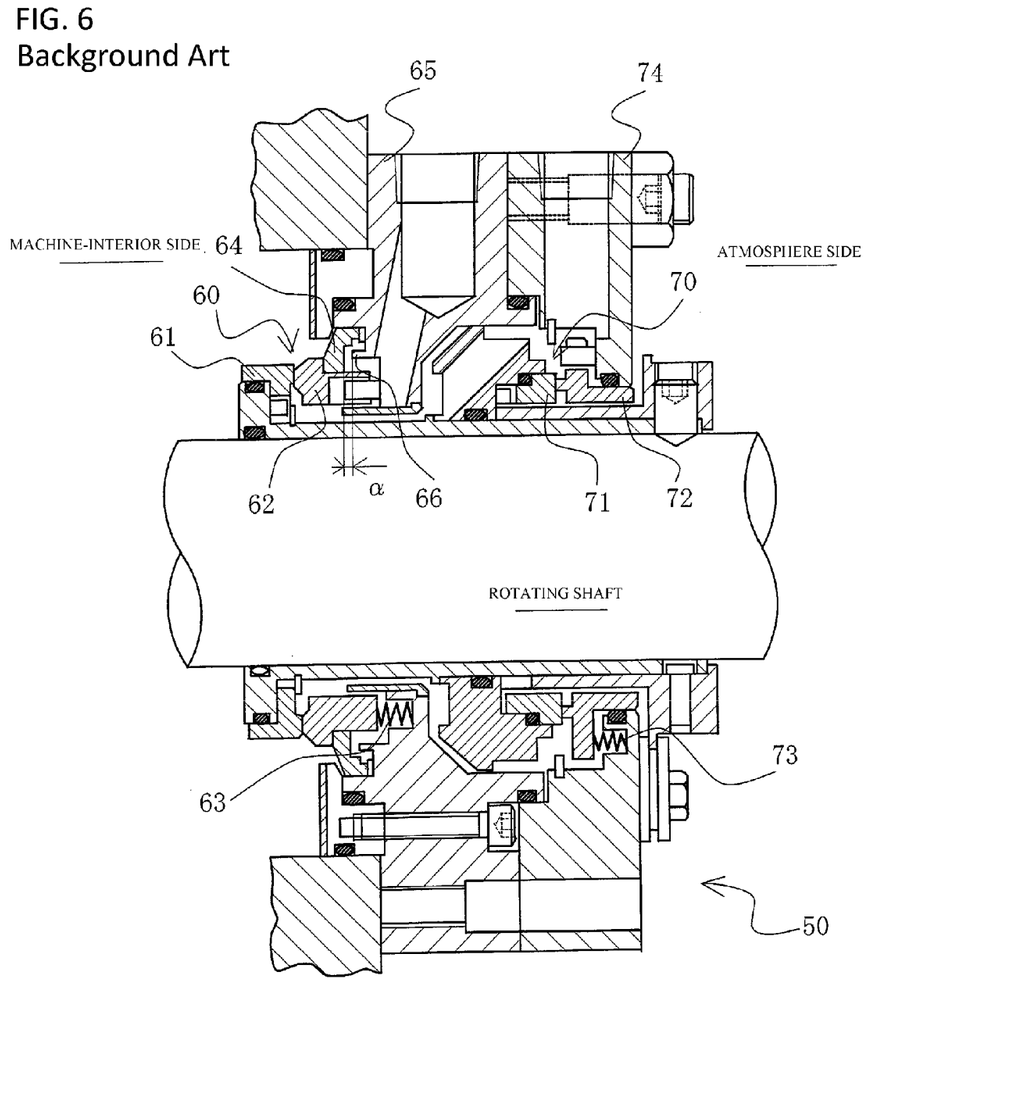
FIG. 6 is a vertical cross-sectional view illustrating the entirety of a mechanical seal according to the prior art.

FIG. 6 is a vertical cross-sectional view illustrating the prior art.

A mechanical seal device 50 comprises a machine-interior mechanical seal 60 and a machine-exterior (atmosphere-side) mechanical seal 70.

The machine-exterior mechanical seal 60 comprises a rotary-side sealing ring 61 arranged on the machine-interior side and a stationary-side sealing ring 62 arranged on the machine-exterior side. In the machine-interior mechanical seal 60, the stationary-side sealing ring 62 is pushed in the direction of the rotary-side sealing ring 61 by a spring 63 mounted in a first seal case 65 and by a packing 64 made of a rubber material, and a sealing sliding surface is formed.

The machine-exterior mechanical seal 70 comprises a rotary-side sealing ring 71 arranged on the machine interior side and a stationary-side sealing ring 72 arranged on the machine exterior side. In the machine-exterior mechanical seal 70 as well, the stationary-side sealing ring 72 is pushed in the direction of the rotary-side sealing ring 71 by a spring 73 mounted on a second seal case 74, and a sealing sliding surface is formed.

In the machine-interior mechanical seal 60, a ring-shaped projection 66 projecting toward the back surface of the packing 64 is provided to the first seal case 65. A configuration is adopted such that, when the apparatus is assembled, a predetermined gap α will be present between the ring-shaped projection 66 and the back surface of the ring-shaped packing 64. During operation, when the pressure on the machine-interior increases, an inner circumferential side of the ring-shaped packing 64 deforms toward the machine-exterior side, but at that time the ring-shaped projection 66 provided to the first seal case 65 supports the back surface of the ring-shaped packing 64, and serves to hinder any deformation of the packing 64 beyond the gap α.

When the sealed fluid is a slurry, the slurry may stick to the spring 63 mounted on the first seal case 65 of the machine-interior mechanical seal 60, and thereafter cling thereto. In such instances, the spring 63 is entirely unable to function, and the ring-shaped rubber packing 64 alone is solely responsible for the function of pressing the stationary-side sealing ring 62 toward the sliding surface.

Figure 7:
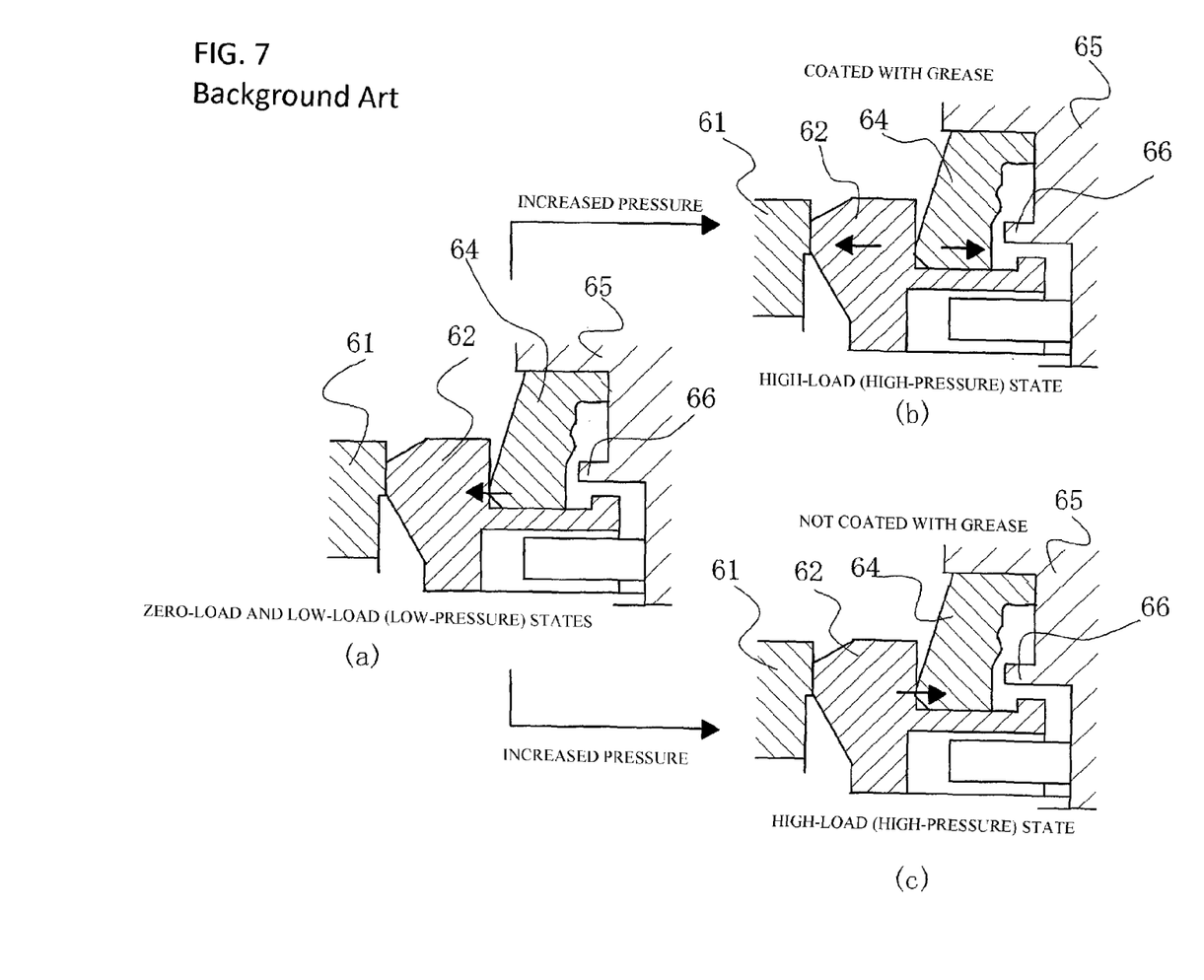
FIG. 7 is a descriptive drawing illustrating the circumstances of the stationary-side sealing ring and the packing in a zero-load state, a low-load state, and a high-load (high-pressure) state of the mechanical seal of the prior art.

FIG. 7 is a descriptive drawing illustrating the stationary-side sealing ring 62 and the packing 64 in a zero-load state, a low-load state, and a high-load (high-pressure) state in a case in the prior art where the spring 63 is entirely unable to function.

FIG. 7(a) illustrates the no-load state and the low-load state; in these states, the stationary-side sealing ring 62 is pushed in the direction of the rotary-side sealing ring 61 by the ring-shaped packing 64, and the sealing sliding surface is formed.

FIGS. 7(b) and 7(c) are illustrations of the high-load (high-pressure) state, where FIG. 7(b) illustrates a case in which the inner circumference of the packing 64 has been coated with grease and FIG. 7(c) illustrates a case in which the inner circumference of the packing 64 has not been coated with grease.

In the case in FIG. 7(b) where the inner circumference of the packing 64 has been coated with grease, the coefficient of friction between the inner circumference of the packing 64 and the stationary-side sealing ring 62 is lowered and the pressure of the machine-interior side acts on the machine-interior side of the packing 64; the packing 64 deforms, and the inner circumferential side, which is a free end thereof, attempts to withdraw. At this time, because the coefficient of friction between the inner circumference of the packing 64 and the stationary-side sealing ring 62 is low, only the inner circumferential side of the packing 64 withdraws, sliding with respect to the stationary-side sealing ring 62, but the sliding surface between the stationary-side sealing ring 62 and the rotary-side sealing ring 61 just manages to achieve a state where a seal is formed, due to the pressure of the sealed fluid.

By contrast, in the case in FIG. 7(c) where the inner circumference of the packing 64 is not coated with grease, the coefficient of friction between the inner circumference of the packing 64 and the stationary-side sealing ring 62 is high, and when a certain pressure is reached, the pressure whereby the inner circumferential side of the packing 64 withdraws becomes greater than the pressure pressing on the stationary-side sealing ring 62 toward the sliding surface. The stationary-side sealing ring 62 withdraws together with the inner circumferential side of the packing 64, and the sliding surface between the stationary-side sealing ring 62 and the rotary-side sealing ring 61 opens and enters a state where leakage occurs.

CITATION LIST

Patent Literature

Patent Document 1: Domestic Re-publication of PCT International Application No. 2009-008289

SUMMARY OF INVENTION

Technical Problem

An object of the present invention, which has been contrived in order to resolve the problems of the prior art, is to provide a mechanical seal configured such that, during the assembly thereof, a ring-shaped projection provided to a seal case will push against a back surface of a packing pushing on a stationary-side sealing ring toward a sliding surface, whereby a stable seal with no leakage is obtained without the need to provide a spring for pushing on the stationary-side sealing ring toward the sliding surface, even when fluctuation occurs in the pressure of a sealed fluid on a machine-interior side.

Solution to Problem

In order to achieve the foregoing objective, the mechanical seal according to a first aspect of the present invention is an inside-type mechanical seal mounted between a rotating shaft and a housing, and adapted for preventing leakage of a sealed fluid from an outer circumference of a sliding surface in the direction of an inner circumference thereof; wherein the mechanical seal is characterized in that there are provided a rotary-side sealing ring mounted on a rotating shaft side and a stationary-side sealing ring mounted on a seal case side; there is provided an annular packing for pushing the stationary-side sealing ring toward the rotary-side sealing ring, a holding part on the outer circumferential side being fitted in the seal case, and a seal lip part on the inner circumferential side being in close contact with the stationary-side sealing ring; and there is provided to the seal case a ring-shaped projection abutting against a back surface of the packing during assembly of the mechanical seal, and adapted for pushing the packing toward the stationary-side sealing ring.

The mechanical seal according to a second aspect of the present invention is the mechanical seal of the first aspect, characterized in that the ring-shaped projection provided to the seal case is formed from a metal, and the packing is formed from a rubbery elastic material.

The mechanical seal according to a third aspect of the present invention is the mechanical seal of the second aspect, characterized in that the ring-shaped projection is integrally provided to the seal case.

The mechanical seal according to a fourth aspect of the present invention is the mechanical seal of the first aspect, characterized in that the packing and the ring-shaped projection provided to the seal case are formed from a rubbery elastic material.

The mechanical seal according to a fifth aspect of the present invention is the mechanical seal of the fourth aspect, characterized in that the rubber hardness of the packing is higher than the rubber hardness of the ring-shaped projection.

The mechanical seal according to a sixth aspect of the present invention is the mechanical seal of the fourth aspect, characterized in that the rubber hardness of the packing and the rubber hardness of the ring-shaped projection are substantially the same.

The mechanical seal according to a seventh aspect of the present invention is the mechanical seal of the fourth through sixth aspects, characterized in that the ring-shaped projection is provided to the seal case by being baked.

The mechanical seal according to an eighth aspect of the present invention is the mechanical seal of the first aspect, characterized in that the ring-shaped projection provided to the seal case is formed from an O-ring, and the packing is formed from a rubbery elastic material.

Advantageous Effects of Invention

The present invention demonstrates the exceptional effects outlined below.

(1) Adopting a configuration such that, during assembly of the mechanical seal, the ring-shaped projection provided to the seal case will press up against the back surface of the packing for pushing the stationary-side sealing ring toward the sliding surface, without the need to provide a spring for pushing the stationary-side sealing ring toward the sliding surface, makes it possible to obtain a stable seal with no leakage. This is because even when the pressure of the sealed fluid fluctuates, there is little fluctuation in the pushing force of the sliding surface, and a predetermined pressure load range is adopted. In particular, in a case where the inner circumference of the packing is not coated with grease, it is still possible for the pushing force of the sliding surface to be substantially constant even when the pressure of the sealed fluid fluctuates.

(2) The projection can be provided to the seal case in an integral fashion in a case where the ring-shaped projection is formed from a metal, and thus the number of components can be reduced and the cost of production can be lowered.

(3) Providing the ring-shaped projection to the seal case by baking in the case where the ring-shaped projection and the packing are formed from a rubbery elastic material makes it possible to reduce the number of components and to lower the cost of production.

(4) In the case where the ring-shaped projection is formed from an O-ring, an existing O-ring can be mounted thereon merely by machining an O-ring groove into the seal case, and thus the cost of production can be lowered.

DESCRIPTION OF EMBODIMENTS

Modes for carrying out the mechanical seal according to the present invention shall now be described in greater detail with reference to the accompanying drawings; however, the present invention shall not be interpreted as being limited thereto, and a variety of modifications, embellishments, and improvements could be added on the basis of the knowledge of a person skilled in the art without departing from the scope of the present invention.

First Embodiment

Figure 1:
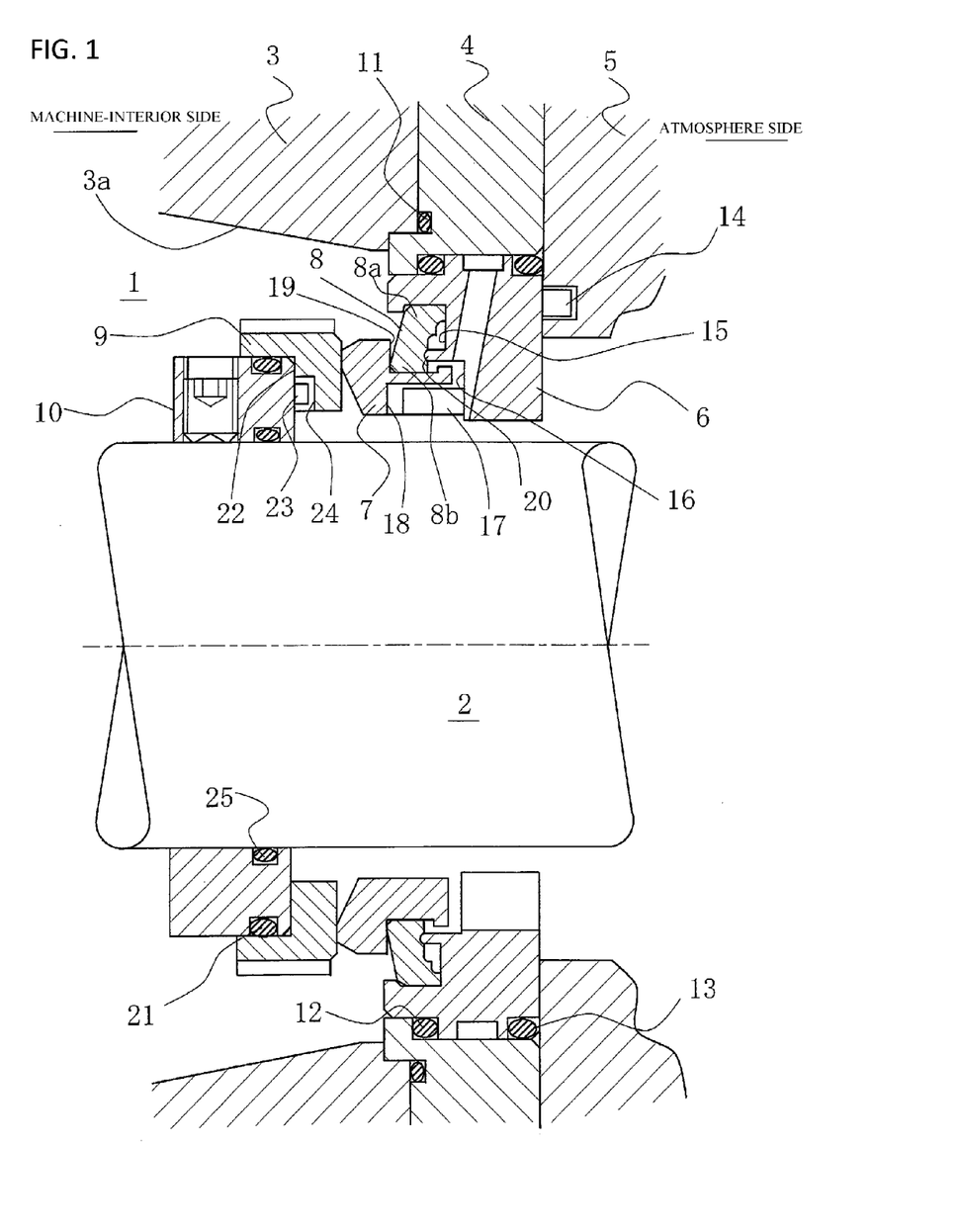
FIG. 1 is a vertical cross-sectional view illustrating the entirety of a mechanical seal according to a first embodiment of the present invention.

FIG. 1 is a drawing illustrating the configuration of a mechanical seal 1 according to the first embodiment of the present invention, and is a vertical cross-sectional view where a plane passing through the center of a rotating shaft 2 serves as the plane of section. In FIG. 1, the left side is a machine-interior side and the right side is an atmosphere side.

The mechanical seal 1 is a sealing apparatus of a form to be mounted in a shaft hole part 3a of a housing 3 through which a rotating shaft 2 penetrates, and is an inside-type mechanical seal for preventing leakage of a sealed fluid from an outer circumference of a sliding surface in the direction of an inner circumference thereof.

The mechanical seal 1, as a primary configuration thereof, has a first seal housing 4, a second seal housing 5, a seal case 6, a stationary-side sealing ring 7, an annular packing 8, a rotary-side sealing ring 9, and a collar 10.

An O-ring 11 is interposed between the first seal housing 4 and the housing 3, and the first seal housing 4 is fixed to the housing 3 by a fixing bolt or the like (not shown), together with the second seal housing 5.

The seal case 6 is mounted on the second seal housing 5 via a knock pin 14 in a state where a seal is created between the machine-interior side and the atmosphere side interposed by O-rings 12 and 13, bounded on one side by the first housing 4. The cross-sectional shape of the seal case 6 is substantially rectangular; an outer circumferential surface in contact with the first seal housing 4, a back surface in contact with the second seal housing 5, and an inner circumferential surface facing the rotating shaft 2 with a gap therebetween are substantially straight in shape. A ring-shaped packing accommodation recess 15 capable of accommodating the packing 8 is formed in a radial-direction intermediate part facing the machine-interior side, and a ring-shaped stationary-side sealing ring accommodation recess 16 capable of accommodating a rear part of the stationary-side sealing ring 7 is formed on a radially-directed inner circumferential side.

The seal case 6 is formed from an austenitic stainless steel or other metal material.

A ring-shaped projection 20 which abuts against the back surface of the packing 8 during assembly of the mechanical seal, and pushes on a seal lip part on the inner circumferential side of the packing 8 towards the rear of the stationary-side sealing ring 7 is provided in the vicinity of the packing accommodation recess 15 of the seal case 6 closer to the stationary-side sealing ring accommodation recess 16.

The stationary-side sealing ring 7 forms a substantially L-shaped cross-sectional shape, and is mounted such that the rear part thereof is accommodated in the stationary-side sealing ring accommodation recess 16 of the seal case 6 via the packing 8. A surface facing the rotary-side sealing ring 9, which is an end surface of the machine-interior side thereof, is formed as a sliding surface. Knock pins 17 are provided in equal distribution in the circumferential direction to a side surface of the stationary-side sealing ring accommodation recess 16 of the seal case 6 so as to project toward the machine-interior side, and a plurality of engagement grooves 18 distributed equidistantly in the circumferential direction are formed so as to correspond to the knock pin 17 on the back surface of the stationary-side sealing ring 7. The knock pin 17 locks onto the engagement grooves 18 of the stationary-side sealing ring 7, whereby the stationary-side sealing ring 7 is held onto the seal case 6 so as not to revolve.

A stepped part 19 in close contact with the packing 8 is formed on the outer circumferential surface of the stationary-side sealing ring 7.

The stationary-side sealing ring 7 is constituted of a material such as silicon carbide, carbon, or a ceramic.

The packing 8 is an annular member made from a rubbery elastic material such as nitrile rubber (nitrile butadiene rubber; NBR), hydrogenated NBR (HNBR), ethylene propylene (ethylene propylene diene monomer; EPDM) rubber, perfluoroelastomer, or polytetrafluoroethylene (PTFE). The packing 8 has an anchoring part 8a provided to the outer circumferential side and a seal lip part 8b formed on the inner circumferential side. The anchoring part 8a is fitted to the packing accommodation recess 15 of the seal case 6. The seal lip part 8b is installed so as to abut against the stepped part 19 of the outer circumferential surface of the stationary-side sealing ring 7 and to push the stationary-side sealing ring 7 toward the rotary-side sealing ring 9 by the elastic force of the packing. The packing 8 is thereby held by the packing accommodation recess 15 of the seal case 6 and acts so as to push on the stationary-side sealing ring 7 toward the rotary-side sealing ring 9 while also receiving the pressure of the sealed fluid.

The rotary-side sealing ring 9 is mounted on the rotating shaft 2 by the collar 10.

The rotary-side sealing ring 9 has a step 22 formed on the inner circumferential side, the step 22 being tightly fitted into the collar 10 via an O-ring 21. A surface which is an end surface directed toward the atmosphere-side and faces the stationary-side sealing ring 7 is formed as the sliding surface.

A plurality of knock pins 23 are formed at equal distribution in the circumferential direction on the side surface of the collar 10 abutting against the side surface of the rotary-side sealing ring 9, so as to project toward the atmosphere-side in the axial direction. A plurality of engagement grooves 24 distributed equidistantly in the circumferential direction are formed on the rotary-side sealing ring 9 so as to correspond to the knock pins 23. The knock pins 23 lock into the engagement grooves 24 of the rotary-side sealing ring 9, whereby relative revolution of the rotary-side sealing ring 9 with respect to the rotating shaft 2 is hindered and the rotary-side sealing ring 9 is held on the rotating shaft 2. An O-ring 25 is also mounted on the inner circumferential surface of the collar 10.

The rotary-side sealing ring 9 is constituted of a material such as silicon carbide, carbon, or a ceramic.

In the mechanical seal 1 having the configuration of such description, the stationary-side sealing ring 7 is pushed toward the machine-interior side, i.e., in the direction of the rotary-side sealing ring 9, by the elastic force of the seal lip part 8b of the packing 8.

As a result, the mutually opposed sliding surface of the rotary-side sealing ring 9 and sliding surface of the stationary-side sealing ring 7 are brought into close contact by a predetermined pressure. The rotating of the rotating shaft 2 also causes only the rotary-side sealing ring 9 to rotate, and the sliding surfaces of the rotary-side sealing ring 9 and the stationary-side sealing ring 7 slide in a state of close contact and form a seal.

Figure 2:
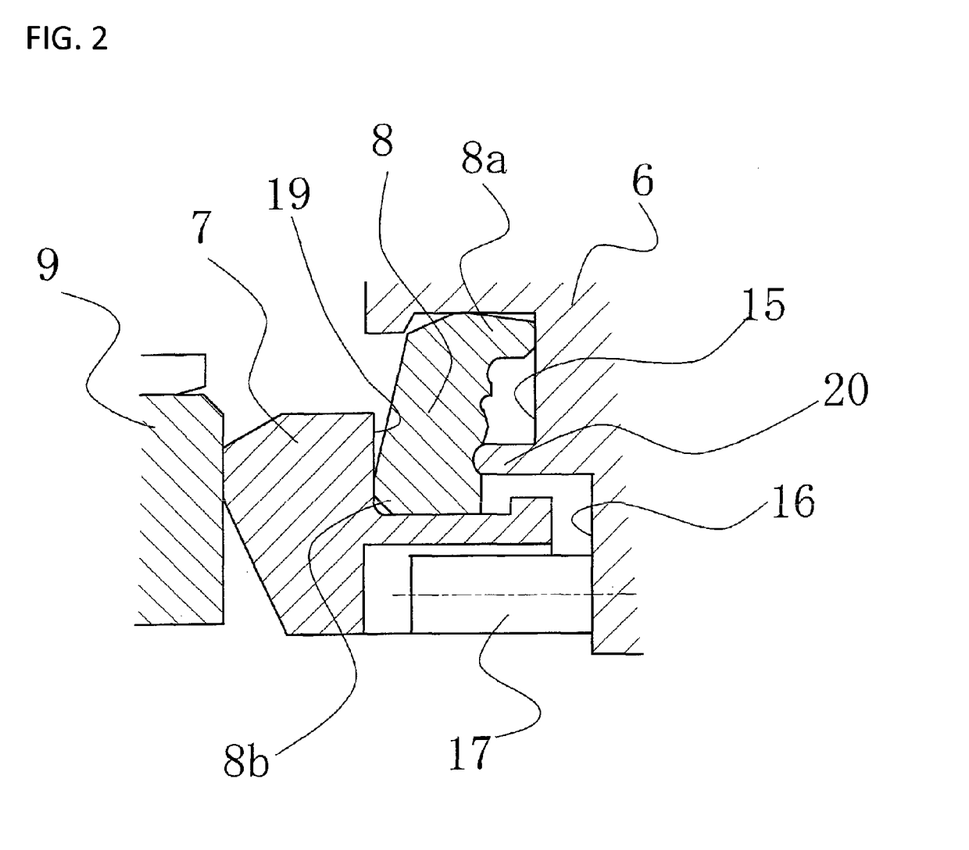
FIG. 2 is a vertical cross-sectional view of an enlarged illustration of the main parts of the mechanical seal according to the first embodiment of the present invention.

FIG. 2 is a vertical cross-sectional view of an enlarged illustration of the main parts of the mechanical seal of the first embodiment of the present invention.

In FIG. 2, the packing 8 is assembled such that the anchoring part 8a is fitted to the packing accommodation recess 15 of the seal case 6, the seal lip part 8b abuts against the stepped part 19 of the stationary-side sealing ring 7, and the stationary-side sealing ring 7 is pushed toward the rotary-side sealing ring 9 by the elastic force of the packing. However, the ring-shaped projection 20 provided in the packing accommodation recess 15 of the seal case 6 toward the stationary-side sealing ring accommodation recess 16 abuts against the back surface of the packing 8 during the assembly of the mechanical seal and pushes on the seal lip part 8b of the inner circumferential side of the packing 8 toward the rear of the stationary-side sealing ring 7. More specifically, during the assembly of the mechanical seal, the dimensional relationship becomes such that the projection 20 compresses the packing 8, in which state the packing 8 and the stationary-side sealing ring 7 are installed on the seal case 6.

The projection 20 is made of metal and may be formed integrally with the seal case 6 when the seal case 6 is made of metal. Because the projection 20 can be provided in an integral fashion to the seal case 6, the number of components can be reduced and the cost of production can be lowered. An angled part on the distal end of the projection 20 is machined into an "R" profile, and is given a stable state of abutment against the packing 8 such that the packing 8 will not be damaged even during long-term usage. Preferably, the hardness of the packing 8 is in the range of 50-70 according to JIS K6523; more preferably, the hardness of the packing 8 is in the range of 55-64, slightly less hard than the hardness of a tire for an automobile, which is 65.

During operation, the pressure of the sealed fluid acts on the surface on the machine-interior side of the packing 8, but because the ring-shaped projection 20 abuts against the back surface of the packing 8 during the assembly of the mechanical seal, and because the mechanical seal is assembled in a state where the packing 8 is compressed, a state where the stationary-side sealing ring 7 is pushed in the direction of the rotary-side sealing ring 9 by the elastic force of the seal lip part 8b of the packing 8 is maintained.

Second Embodiment

Figure 3:
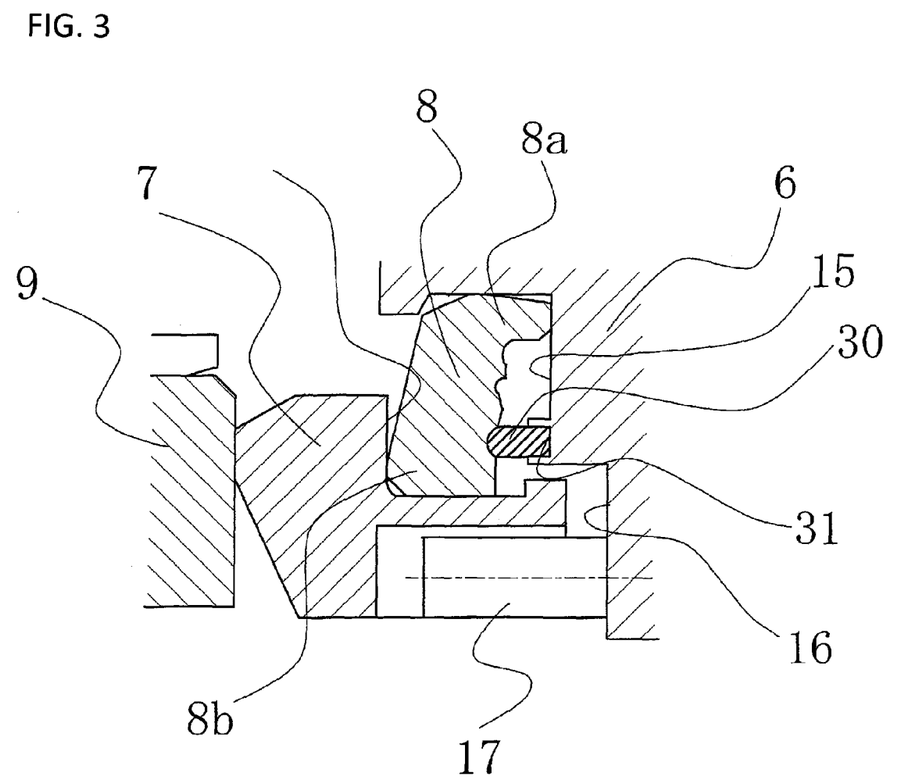
FIG. 3 is a vertical cross-sectional view of an enlarged illustration of the main parts of the mechanical seal according to a second embodiment of the present invention.

FIG. 3 is a vertical cross-sectional view of an enlarged illustration of the main parts of a mechanical seal according to the second embodiment of the present invention.

In FIG. 3, reference numerals identical to those in FIG. 2 represent members identical to those in FIG. 2, and a more detailed description thereof is omitted.

A ring-shaped projection 30 having a cross-section that forms a horizontally oriented rectangle comprises a rubbery elastic material such as nitrile rubber (nitrile butadiene rubber; NBR), hydrogenated NBR (HNBR), ethylene propylene (ethylene propylene diene monomer; EPDM) rubber, perfluoroelastomer, or polytetrafluoroethylene (PTFE); and a proximal part of the ring-shaped member is fitted in a ring-shaped recess 31 provided to the seal case 6, and, e.g., baked or otherwise anchored thereto. Because the ring-shaped projection 30 can be provided by to the seal case 6 by being baked thereto, the number of components can be reduced and the cost of production can be lowered. An angled part on a distal end of the projection 30 is machined into an "R" profile, and is given a stable state of abutment against the packing 8 such that the packing 8 will not be damaged even during long-term usage. The packing 8 is made of a rubbery elastic material. Preferably, the hardness of the packing 8 is in the range of 50-70 according to JIS K6523; more preferably, the hardness of the packing 8 is in the range of 63-70, substantially the same as the hardness of a tire for an automobile, which is 65. By contrast, the hardness of the projection 30 is in the range of 50-70 according to JIS K6523; more preferably, the hardness of the projection 30 is in the range of 55-64, slightly less hard than the hardness of a tire for an automobile, which is 65.

Otherwise, the hardnesses of the packing 8 and the projection 30 may also be set to be the same within the range of 50-70 in JIS K6523, more preferably within the range of 55-64, slightly less hard than the hardness of a tire for an automobile, which is 65.

During operation, the pressure of the sealed fluid acts on the surface on the machine-interior side of the packing 8, but because the ring-shaped projection 30 made of a rubbery elastic material abuts against the back surface of the packing 8 during the assembly of the mechanical seal and because assembly is carried out in a state where the packing 8 is compressed, a state where the stationary-side sealing ring 7 is pushed in the direction of the rotary-side sealing ring 9 by the elastic force of the seal lip part 8b of the packing 8 is maintained.

Third Embodiment

Figure 4:
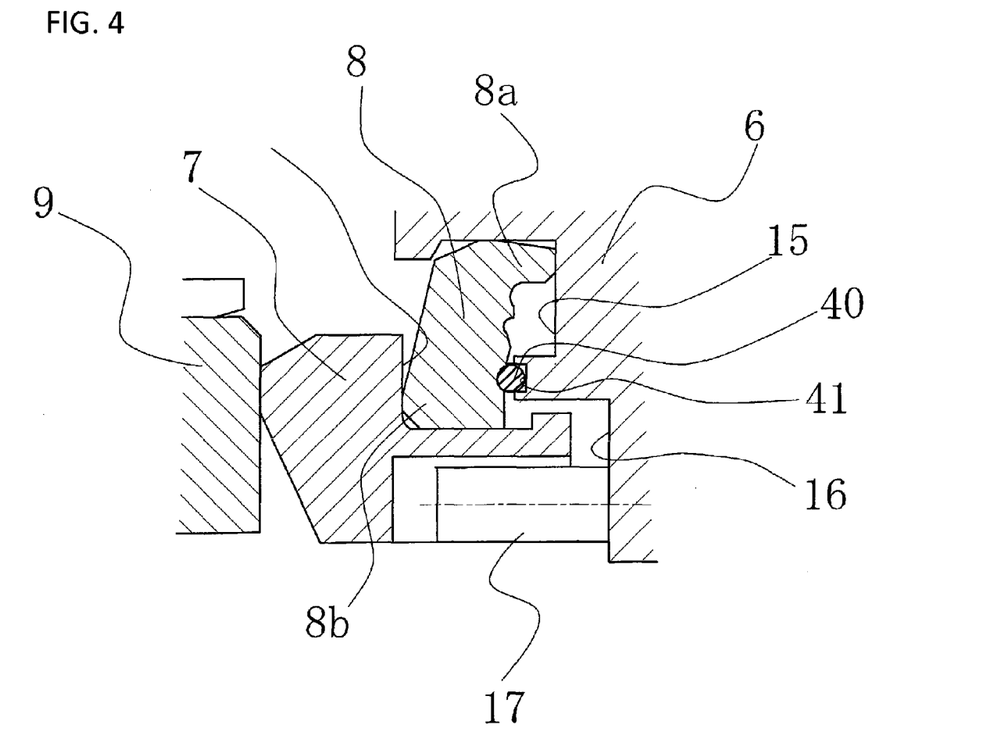
FIG. 4 is a vertical cross-sectional view of an enlarged illustration of the main parts of the mechanical seal according to a third embodiment of the present invention.

FIG. 4 is a vertical cross-sectional view of an enlarged illustration of the main parts of a mechanical seal according to the third embodiment of the present invention.

In FIG. 4, reference numerals identical to those in FIG. 2 represent members identical to those in FIG. 2, and a more detailed description thereof is omitted.

A projection 40 comprises an O-ring and is mounted while in a state projecting by about half from an O-ring groove 41 provided to the seal case 6. Because the ring-shaped projection 40 is formed from an O-ring, an existing O-ring can be mounted merely by machining the O-ring groove 41 into the seal case 6, and thus the cost of production can be lowered.

The O-ring is selected from a rubbery elastic material such as nitrile rubber (nitrile butadiene rubber; NBR), hydrogenated NBR (HNBR), ethylene propylene (ethylene propylene diene monomer; EPDM) rubber, perfluoroelastomer, or polytetrafluoroethylene (PTFE).

During operation, the pressure of the sealed fluid acts on the surface on the machine-interior side of the packing 8. However, a state where the stationary-side sealing ring 7 is pushed in the direction of the rotary-side sealing ring 9 by the elastic force of the seal lip part 8b of the packing 8 is maintained since the projection 40 comprising an O-ring abuts against the back surface of the packing 8 during the assembly of the mechanical seal, and the mechanical seal is assembled in a state where the packing 8 is compressed.

Figure 5:
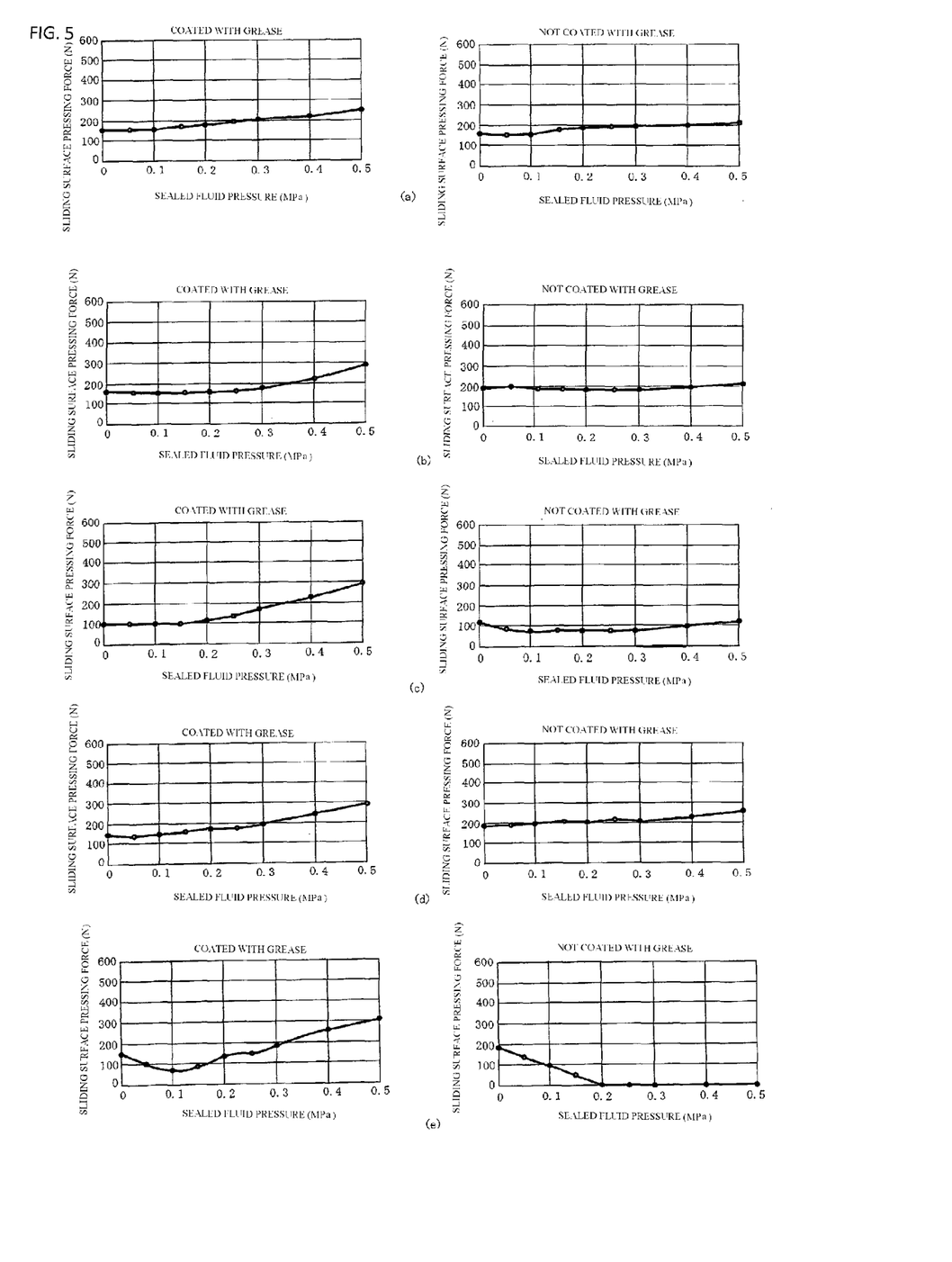
FIG. 5 is a drawing illustrating measurement results for the pushing load of the packing with respect to the stationary-side sealing ring of mechanical seals according to the first through third embodiments of the present invention and a mechanical seal according to the prior art.

FIG. 5 is a drawing illustrating measurement results for the pushing load of the sliding surface in mechanical seals according to the first through third embodiments of the present invention and a mechanical seal according to the prior art.

FIG. 5(a) illustrates a case in the first embodiment where the ring-shaped projection is formed from a metal and the packing is formed from a rubbery elastic material. FIG. 5(b) illustrates a case in the second embodiment where the ring-shaped projection and the packing are formed from a rubbery elastic material and the rubber hardness of the packing is greater than the rubber hardness of the ring-shaped projection. FIG. 5(c) illustrates a case in the second embodiment where the ring-shaped projection and the packing are formed from a rubbery elastic material and the rubber hardness of the packing and the rubber hardness of the ring-shaped projection are substantially the same. FIG. 5(d) illustrates a case in the third embodiment where the ring-shaped projection is formed from an O-ring. FIG. 5(e) illustrates a case from the prior art.

In FIGS. 5(a) to 5(d), assembly has been carried out in a state where the packing is compressed 0.5 mm in the axial direction by the ring-shaped projection; in FIG. 5(e), assembly has been carried out in a state where a 0.5 mm gap in the axial direction exists between the packing and the ring-shaped projection.

In FIG. 5, the drawings on the left side illustrate cases where the inner circumference of the packing has been coated with grease, and the drawings on the right side illustrate cases where the inner circumference of the packing has not been coated with grease.

In the case of the first embodiment in FIG. 5(a) where the ring-shaped projection is formed from a metal and the packing is formed from a rubbery elastic material, the pushing force of the sliding surfaces has little variance even when the pressure of the sealed fluid overall changes, and a predetermined pushing force is obtained.

In the case of the second embodiment in FIG. 5(b) where the ring-shaped projection and the packing are formed from a rubbery elastic material and the rubber hardness of the packing is greater than the rubber hardness of the ring-shaped projection, although the pushing force is higher in comparison to FIG. 5(a) when the pressure of the sealed fluid is low in a case where coating with grease has not been carried out, the pushing force of the sliding surfaces has little variance even when the pressure of the sealed fluid overall changes.

The case of the second embodiment in FIG. 5(c) where the ring-shaped projection and the packing are formed from a rubbery elastic material and the rubber hardness of the packing and the rubber hardness of the ring-shaped projection are substantially the same is substantially equivalent to FIG. 5(a), there being little attenuation of the pushing force, and a predetermined pushing force is obtained.

In the case of the third embodiment in FIG. 5(d) where the ring-shaped projection is formed from an O-ring, the pushing force of the sliding surfaces is somewhat greater in comparison to FIGS. 5(a) to 5(c) when the pressure of the sealed fluid is higher, but there is little attenuation of the pushing load, and a predetermined pushing force range is reached.

In FIGS. 5(a) to 5(d), in particular in a case where the inner circumference of the packing has not been coated with grease, the pushing force of the sliding surfaces can be made substantially constant even when the pressure of the sealed fluid fluctuates.

By contrast, in the case of the prior art in FIG. 5(e), a range of greater attenuation of the pushing force is present within the range where the pressure of the sealed fluid is low when coating has been carried out with grease, and when coating has not been carried out with grease, the pushing force becomes null when the pressure of the sealed fluid is higher, and the function of the packing is no longer being realized.

The mechanical seals of the embodiments of the present invention have thus been found to obtain a predetermined pushing force, with little fluctuation in the pushing force of the sliding surfaces, even when the pressure of the sealed fluid fluctuates and irrespective of whether or not there is a grease coating. By contrast, in the case of the prior art it was evident that when a grease coating was applied, the pushing force was extremely low in the range where the pressure of the sealed fluid was low, and when a grease coating was not applied, the pushing force was zero when the pressure of the sealed fluid is higher, and the function of the packing was no longer be realized.

REFERENCE SIGNS LIST

1 Mechanical seal
2 Rotating shaft
3 Housing
4 First seal housing
5 Second seal housing
6 Seal case
7 Stationary-side sealing ring
8 Packing
9 Rotary-side sealing ring
10 Collar
11 O-ring
12 O-ring
13 O-ring
14 Knock pin
15 Packing accommodation recess
16 Stationary-side sealing ring accommodation recess
17 Knock pin
18 Engagement groove
19 Stepped part
20 Projection
21 O-ring
22 Step
23 Knock pin
24 Engagement groove
25 O-ring
30 Projection
31 Recess
40 Projection
41 O-ring

The invention claimed is:

1. An inside-type mechanical seal mounted between a rotating shaft ad a housing and adapted for preventing leakage of a sealed fluid from an outer circumference of a sliding surface in a direction of an inner circumference thereof, said seal comprising
   a rotary-side sealing ring mounted on a rotating shaft side and a stationary-side sealing ring mounted on a seal case side; and
   an annular packing formed of a rubbery elastic material defined by an outer circumference and an inner circumference which is radially closer to the shaft than is the outer circumference, wherein the stationary-side sealing ring and the rotary-side sealing ring are pushed to each other only by the annular packing, and without a spring on either side of the stationary-side sealing ring or the rotary-side sealing ring;
   said annular packing comprising:
      a holding part provided on the outer circumferential side of the annular packing and fitted in a recess of the seal case for holding the annular packing in the seal case, and
      a seal lip part provided on the inner circumferential side of the annular packing and being in close contact with the stationary-side sealing ring, said seal lip part having a front side facing toward the sliding surface and contacting the stationary-side sealing ring, and a back side facing away from the sliding surface;
   wherein the seal case has a ring-shaped projection formed along a circumferential direction, projecting from the seal case into the recess of the seal case on the inner circumferential side in an axial direction toward the sliding surface, and being in positive contact with and abutting against a part of the back side of the seal lip part during assembly of the mechanical seal, said ring-shaped projection pushing the part of the back side of the seal lip part of the inner circumferential side of the annular packing toward the stationary-side sealing ring.

2. The mechanical seal as set forth in claim 1, wherein the ring-shaped projection provided to the seal case is formed from a metal, and the packing is formed from a rubbery elastic material.

3. The mechanical seal as set forth in claim 2, wherein the ring-shaped projection is integrally provided to the seal case.

4. The mechanical seal as set forth in claim 1, characterized in that the packing and the ring-shaped projection provided to the seal case are formed from a rubber elastic material.

5. The mechanical seal as set forth in claim 4, characterized in that the rubber hardness of the packing is higher than the rubber hardness of the ring-shaped projection.

6. The mechanical seal as set forth in claim 4, characterized in that the rubber hardness of the packing and the rubber hardness of the ring-shaped projection are substantially the same.

7. The mechanical seal as set forth in claim 4, characterized in that the ring-shaped projection is provided to the seal case by being baked.

8. The mechanical seal as set forth in claim 1, characterized in that the ring-shaped projection provided to the seal case is formed from an O-ring, and the packing is formed from a rubbery elastic material.

9. The mechanical seal as set forth in claim 5, characterized in that the ring-shaped projection is provided to the seal case by being baked.

10. The mechanical seal as set forth in claim 6, characterized in that the ring-shaped projection is provided to the seal case by being baked.

* * * * *